United States Patent [19]

Power

[11] Patent Number: 4,615,629
[45] Date of Patent: Oct. 7, 1986

[54] INPUT KEYBOARD

[76] Inventor: Daniel J. Power, 4313 Knox #217, College Park, Md. 20740

[21] Appl. No.: 603,315

[22] Filed: Apr. 24, 1984

[51] Int. Cl.[4] .............................................. B41J 5/10
[52] U.S. Cl. .................................... 400/486; 400/489; 340/365 R
[58] Field of Search ...................... 400/87, 88, 91, 92, 400/93, 94, 364, 472, 473, 474, 477, 478, 479, 482, 486, 487, 489, 491.3; 364/200, 900; 340/365 R, 365 VL

[56] References Cited

U.S. PATENT DOCUMENTS

| | | | |
|---|---|---|---|
| 12,929 | 5/1855 | White et al. | 340/365 R X |
| 185,714 | 12/1876 | Allen | 400/486 X |
| 433,765 | 8/1890 | Collins | 400/486 X |
| 560,572 | 5/1896 | Davis | 400/364 |
| 573,623 | 12/1896 | Richards | 400/486 X |
| 706,002 | 8/1902 | Allen | 400/487 |
| 943,466 | 12/1909 | Rowell | 400/486 |
| 1,260,543 | 3/1918 | Howieson | 400/472 X |
| 1,292,319 | 1/1919 | Hooper, Jr. | 400/472 X |
| 1,336,122 | 4/1920 | Banaji | 400/486 |
| 1,342,244 | 6/1920 | Wolcott | 400/486 |
| 2,040,248 | 5/1936 | Dvorak et al. | 400/486 X |
| 2,080,457 | 5/1937 | Bower | 400/486 |
| 2,167,150 | 7/1939 | Haberfeld | 400/472 |
| 2,192,594 | 3/1940 | Brand et al. | 400/479 X |
| 2,503,805 | 4/1950 | Davidson et al. | 400/486 X |
| 2,827,145 | 3/1958 | Anderson | 400/486 X |
| 3,241,649 | 3/1966 | Diamond | 400/474 X |
| 3,526,892 | 9/1970 | Bartlett et al. | 400/477 X |
| 3,847,263 | 11/1974 | X | 400/486 X |
| 3,929,216 | 12/1975 | Einbinder | 400/486 |
| 3,932,859 | 1/1976 | Kyriakides et al. | 364/900 X |
| 3,967,273 | 6/1976 | Knowlton | 400/486 X |
| 3,976,840 | 8/1976 | Cleveland et al. | 340/365 R X |
| 3,990,050 | 11/1976 | Kolettis et al. | 364/200 |
| 4,005,388 | 1/1977 | Morley et al. | 400/88 X |
| 4,180,336 | 12/1979 | Lonsdale | 400/491.3 |
| 4,180,337 | 12/1979 | Otey, III et al. | 400/486 |
| 4,211,497 | 7/1980 | Montgomery | 400/479 X |
| 4,244,659 | 1/1981 | Malt | 400/486 |
| 4,332,493 | 6/1982 | Einbinder | 400/486 X |
| 4,386,245 | 5/1983 | Nimora et al. | 340/365 R X |
| 4,402,624 | 9/1983 | Stahl et al. | 400/472 X |

FOREIGN PATENT DOCUMENTS 2110163 6/1983 United Kingdom ................ 400/472

OTHER PUBLICATIONS

IBM Technical Disclosure Bulletin, "Wallet Terminal Keyboard with Acoustic Coupler", Davis et al, vol. 10, No. 3, Aug. 1967, pp. 188–189.

IBM Technical Disclosure Bulletin, "Optical Keyboard", Dimmick et al, vol. 16, No. 6, Nov. 1973, pp. 1785–1786.

Primary Examiner—Ernest T. Wright, Jr.
Attorney, Agent, or Firm—Larson and Taylor

[57] ABSTRACT

An input keyboard arrangement is provided for microcomputers, computer terminals, and other devices for processing alphanumeric information. The keyboard arrangement facilitates entry of information by non-typists, increases keying accuracy, enables use of the three strongest fingers for depressing keys, and minimizes the time needed to master the keyboard. The keyboard is arranged in a vertical layout with a pair of enter keys, and elongate shift and space bars located around the perimeter of the key arrangement. Each letter of the alphabet is represented by an individual key and the alphabetic keys are arranged in alphabetical order in nine rows with three keys per row so as to facilitate human information processing. Specifically, the keys of the first row are arranged, sinistrally, as c-b-a or, dextrally, as a-b-c, the second row f-e-d or d-e-f, and so on, with the pattern continuing to the ninth row which contains the keys "z-y" or "y-z." A number pad, function keys, cursor control keys, and punctuation keys are also placed so as to facilitate use by non-typists.

15 Claims, 2 Drawing Figures

INPUT KEYBOARD

FIELD OF THE INVENTION

The present invention relates to input keyboards for microcomputers, computer terminals, and other devices for processing alphanumeric information.

BACKGROUND OF THE INVENTION

Although many patents have been granted during the past 100 years for input keyboards, many problems remain unsolved. Numerous patents and other prior art documents have discussed the limitations and inadequacies of the universal or QWERTY keyboard for typists. An example of such a patent is U.S. Pat. No. 3,929,216 (Einbinder). Because of the limitations of the QWERTY keyboard, many previous patents for keyboards have focused on keyboard designs and key arrangements that are designed to increase input speeds, reduce fatigue, reduce errors, and the like. These designs and arrangements are generally targeted for use by people who are frequent and heavy users of keyboards and are of limited value for use as computer input devices by people who are casual, low frequency users without typing training, referred hereafter as non-typists.

Alphabetical keyboard arrangements, i.e., arrangements where the letter keys are simply arranged in alphabetical order, can potentially facilitate the use of keyboards by non-typists, but the obvious alphabetic arrangement of the letter keys in three horizontal rows, i.e., with the top row consisting of the letters a b c d e f g h i j, the second row of the letters k l m n n o p q r s and the third row of the letters t u v w x y z, has been found to be almost as difficult to use and learn as the QWERTY design. In this regard, it appears this obvious alphabetic design neglects important facts as to how humans process information and this apparently accounts for the learning difficulties generally encountered. A more complex alphabetical arrangement of keys, which is designed as part of a telegraphic key apparatus and is apparently not in use, is disclosed in U.S. Pat. No. 12,929 (White). The White patent discloses an arrangement where the keys are disposed in four horizontal rows with the four keys of each vertical column being arranged in alphabetical order. A recent patent which also provides for an alphabetical arrangement of keys is U.S. Pat. No. 4,180,337 (Otey et al). The Otey el al patent recognizes that non-typists need learning aids and that an intuitive ordering of keys in an alphabetical arrangement provides benefits of ease of use by infrequent users. The patent also discloses that in some circumstances one-handed use of a keyboard may have distinct advantages over two-handed use. However, the Otey et al patent focuses on the vowels in Western languages in an attempt to create a meaningful pattern for users. The keys of the keyboard disclosed therein are arranged in five primary rows with each primary row beginning with a vowel-representing key. Each vowel-representing key is followed by consonant representing keys and an alphabetical order is maintained. This keyboard arrangement suffers important disadvantages and most people will face two major difficulties with the keyboard design of the Otey et al patent. First, placing six keys in the third, fourth and fifth primary rows results in an arrangement wherein the short-term memory capacity of the user is exceeded, thus increasing the learning time of the arrangement. Second, placing six keys in a row requires awkward lateral hand-movements and encourages people to use four or five digits of the hand, resulting in weak and awkward thumb and fourth finger movements.

Other patents in this general field which are of possible interest include: U.S. Pat. Nos. 185,714 (Allen); 433,765 (Collins); 560,572 (Davis); 573,623 (Richards); 943,466 (Rowell); 1,292,319 (Hooper, Jr.); 1,336,122 (Banaji); 1,342,244 (Wolcott); 1,506,426 (Hoke); 2,040,248 (Dvorak et al); 2,080,457 (Bower); 2,167,150 (Haberfeld); 2,503,805 (Davidson et al); 2,827,145 (Anderson); 3,847,263 (X); 3,990,050 (Pitroda); 3,932,859 (Kyriakides et al); 3,925,779 (Gerstenhaber); 4,211,497 (Montgomery); 4,180,336 (Lonsdale); 4,244,659 (Malt); and 4,332,493 (Einbinder).

SUMMARY OF THE INVENTION

The present invention is directed to a keyboard arrangement in which the keys are grouped in a unique alphabetical pattern which avoids problems caused by human perceptual and information processing limitations, and uses prior human learning patterns of the alphabet to facilitate learning of the keyboard arrangement. The present invention breaks out of the mindset of only viewing an input keyboard device as a horizontal arrangement of keys. Each key of the keyboard of the invention represents a single letter of the alphabet and in accordance with a very important aspect of the invention, the keys are arranged in alphabetical order in nine rows of three keys per row. The provision of three letter keys in each row is very important for a number of reasons. First, people can verbalize each row and easily maintain a row of information in short-term memory, which facilitates repetition and learning. In this regard, short-term memory in humans is limited to five to nine "chunks" of information and groups of three letters beginning with a, b, c or c,b, a can be represented with nine or fewer "chunks" in memory. Second, the limits of human short-term memory force most people to learn and recite the alphabet in groups of three letters. By arranging the letters alphabetically in rows of three, the invention employs the early human learning pattern of the alphabet to facilitate use of the keyboard by people in low and moderate use situations. Further, it is noted that the keys in the alphabet that are used most frequently in prose occur in the first twenty-one letters so that most of the use of the keyboard will involve the first seven rows. People can also "chunk" (i.e., effectively mentally group) and encode these relationships easily.

A further important advantage of the keyboard arrangement of the invention is decreased demand made on the user insofar as finger movement and dexterity is required. The QWERTY keyboard, as well as most other designs, suffer from the uneven kinesthetic (muscle) resistance on the outer keys thereof. The keyboard of the present invention provides a three finger span which makes no demands on the weaker fingers of the hand. Further, the keyboard of the invention enables one-hand use, an important feature in view of studies which show that the keystroke timing is least accurate when two hands are used. This is, of course, a substantial advantage for non-typists who can be expected to make errors routinely. Further, as discussed above, accuracy is further enhanced for the non-typist, who would otherwise be forced to deal with an unfamiliar keyboard, by the provision in the keyboard of invention of the familiar alphabetical arrangement of keys, in readily useable groups of three.

As is discussed in more detail below, other important features of the invention include the provision of elongate space and shift bars along the sides of the keyboard which extend the full length of the keyboard. Further, enter bars are provided both at the bottom and top of the keyboard. These features further contribute to the ease of use of the keyboard by a non-typist. In addition, a number "pad" is provided wherein the numbers are arranged in groups or rows of three with the "zero" key being located centrally below the bottom row. Other keys are also arranged in manner which enhances learning, provides for efficient, effective use with the three strongest fingers and increases accuracy.

Other features and advantages of the invention will be set forth in, or apparent from, the detailed description of the preferred embodiments of the invention which follows.

DESCRIPTION OF THE PREFERRED EMBODIMENTS

Figure 1:
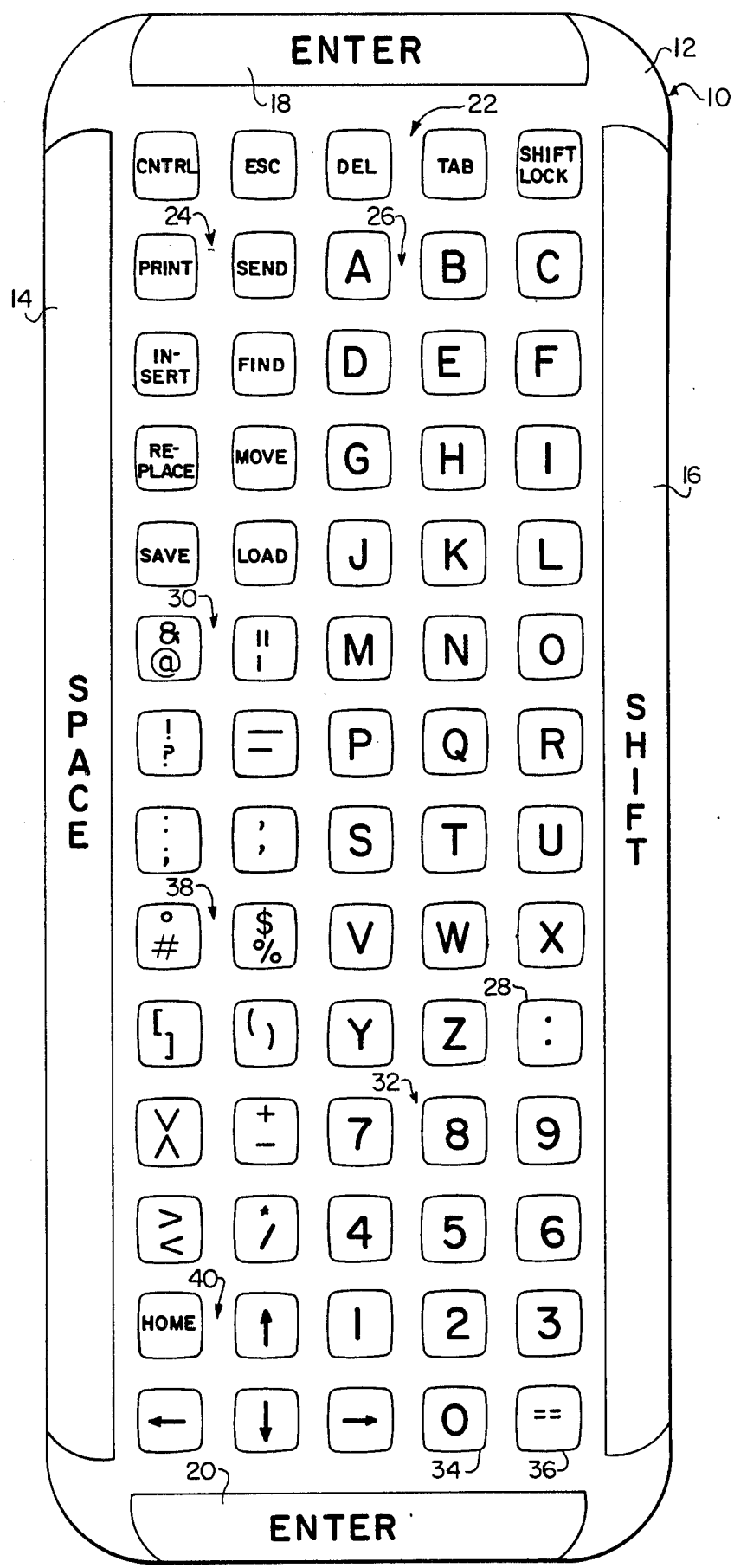
FIG. 1 is a plan view of a keyboard constructed in accordance with a first preferred embodiment of the invention.

Referring to FIG. 1, a keyboard, generally denoted 10, is shown which is constructed in accordance with a preferred dextral embodiment of the invention. The keys of the keyboard 10, are arranged on a tablet or pallet 12 in fourteen rows of five keys across, thereby accommodating a comfortable three finger span. An extra-long space bar 14 is located at the left margin of the keyboard 10, extending the entire length of the key arrangement for easy operation with the thumb. Similarly, an elongate shift bar 16 extends along the length of the right side of the keyboard 10. At the top and the bottom of the keyboard 10 are a pair of "enter" keys 18 and 20 respectively, that extend across the width of the keyboard 10. Directly under the enter key 18 at the top edge of the keyboard 10 are five color-coded command keys, collectively denoted 22, which are most often used in computer operations. As illustrated, these keys represent: "control", "escape", "delete", "tabulate", and "shift lock".

Other keys are arranged and color-coded according to their functions. Eight color-coded special operation keys, collectively denoted 24, are located in four rows of two across at the top left corner of the keyboard 10, designating, as indicated in the drawing, the following: "print", "send", "insert", "find", "replace", "move", "save", and "load".

In accordance with a very important feature of the invention, word processing keys, which are color-coded grey in a specific exemplary embodiment, are arranged in alphabetical order from left to right in nine rows of three keys each. These keys, which are collectively denoted 26 are located to the right of the keyboard 10, with a period mark key 28 being located next to the "z" key in this set.

The keys 26 are arranged in the dextral left-to-right sequence: abc, def, ghi, jkl, mno, pqr, stu, vwx, yz but can, of course, be arranged in a sinistral right-to-left sequence: cba, fed, ihg, lkj, onm, rqp, uts, xwv, zy. This is illustrated in FIG. 2, which is similar to FIG. 1, but provides for such a sinistral right-to-left key arrangement.

Figure 2:
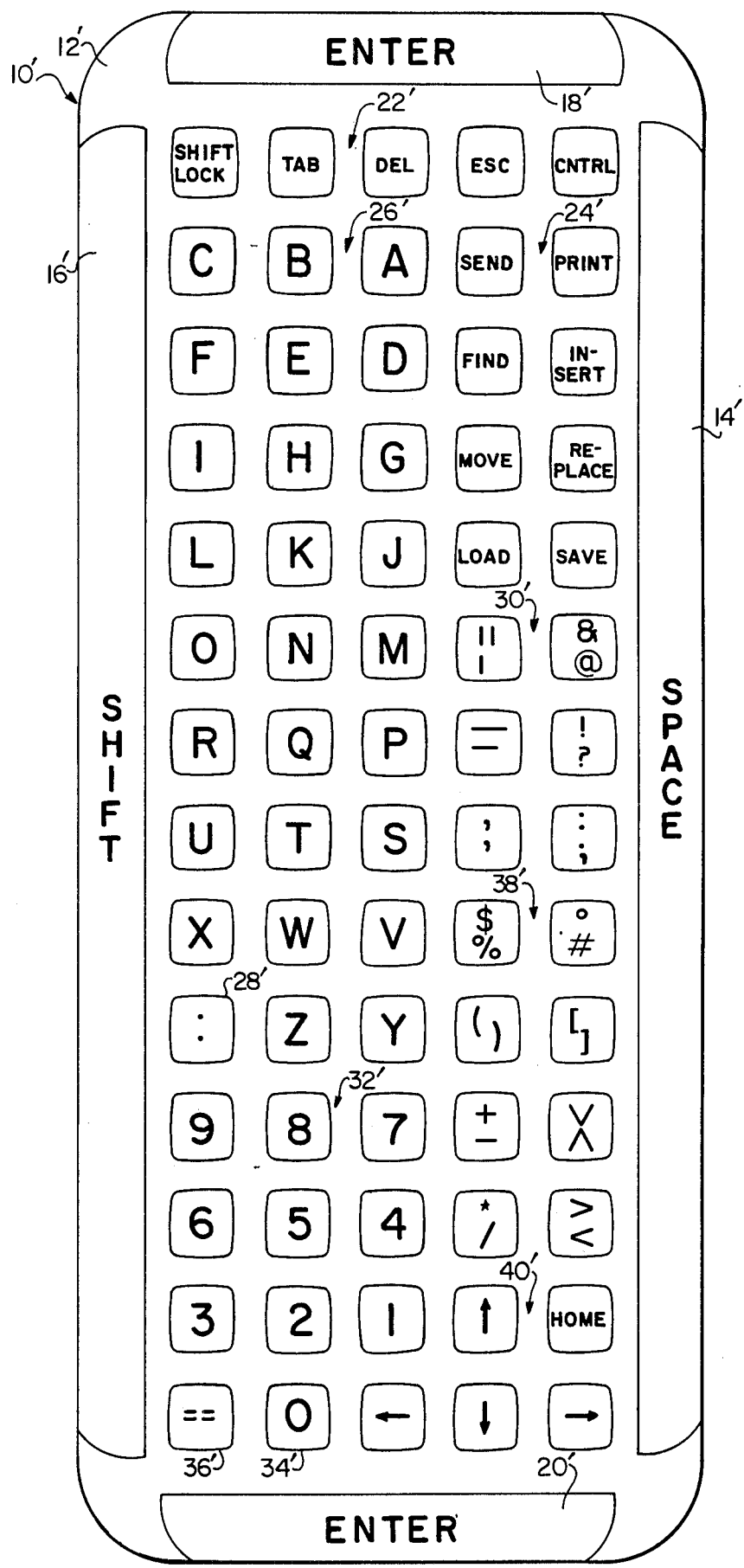
FIG. 2 is a plan view of a keyboard constructed in accordance with a second preferred embodiment of the invention.

In FIG. 2, elements similar to those in FIG. 1 have been given the same reference numerals with a prime attached.

Located immediately to the left of letter keys 26 are six further keys which are collectively denoted 30 and which are needed for word processing. As indicated in the drawing, these comprise a key for single and double quotation marks, one for the dash and the hyphen, one for commas, one for ampersand and @, a key for exclamation and question marks, and a key for colons and semicolons.

A numerical pad is formed by a set of keys which are collectively denoted 32 and which are grouped at the bottom and to the lower right of the keyboard 10. These keys, which are color coded white in a preferred embodiment, include a three column set of three rows of keys which are horizontally numbered one ("1") through nine ("9"), with the "zero" key 34 being placed on the bottom row and being centered under the middle column. A key 36 for the "=" symbol is set next to "zero" key 34, under the "9" key at the lower right hand corner of the keyboard 10.

Situated below the symbols used in word processing, are eight keys collectively denoted 38, which are used in numerical processing. As illustrated, these keys comprise: a key for the dollar sign and percentage, one for parentheses, one for plus and minus signs, a key for asterisk and slash marks, one for the degree symbol and the number sign (#), one for brackets, a key for ∧ and ∨ and one for greater and less than symbols.

Five additional keys, collectively denoted 40, are located in the lower left corner of the keyboard 10. These keys 40, which are color-coded to match the command keys 22 at the top of the keyboard 10, are, as shown, designated as follows: one for "home" and one each with arrows for cursor movement in four directions.

In addition to the physical grouping and color-coding of keys according to functions, viz., word processing, mathematical operations, normal screen control commands, and special functions, the keyboard 10 of the invention preferably utilizes sculptured word processing and mathematical keys for ease of use, and provides eight to ten replaceable function keys.

Although the invention has been described relative to preferred embodiments thereof, it will be understood by those skilled in the art that variations and modifications can be effected in the preferred embodiment without departing from the scope and spirit of the invention.

I claim:

1. A keyboard particularly for use by non-typists, said keyboard comprising: twenty-six letter keys individually designating the twenty-six letters of the alphabet of the English language arranged in alphabetical order in eight rows of three letter keys and one row of two letter keys, and said twenty-six letter keys being arranged in three vertical columns, said keyboard further including a "shift" key which extneds vertically along one side of the keyboard and which is of a length at least as great as the height of the vertical columns of letter keys, and a "space" key which extends vertically along the other edge of the keyboard and which is of a length at least as great of the height of the vertical columns of letter keys, said keyboard further comprising first and second elongate "enter" keys located at the top and bottom of the keyboard and of a width greater than the width of the rows of keys.

2. A keyboard as claimed in claim 1 wherein the letter keys are arranged in the dextral left-to-right sequence abc, def, ghi, jkl, mno, pqr, stu, vwx, and yz.

3. A keyboard as claimed in claim 1 wherein the latter keys are arranged in the sinistral right-to-left sequence cba, fed, ihg, lkj, onm, rqp, uts, xwv, and zy 4. A keyboard as claimed in claim 1 wherein the row containing two letter keys further comprises a third key, said third key comprising a punctuation key.

5. A keyboard as claimed in claim 4 wherein said punctuation key comprises a period key.

6. A keyboard as claimed in claim 1, wherein said keyboard further comprises a set of ten number keys designating the numerals 0 to 9 and arranged in three rows of three keys and one row of one key, arranged in three vertical columns in alignment with the vertical columns of letters.

7. A keyboard as claimed in claim 6 wherein the said one key in said one row is the "zero" key.

8. A keyboard as claimed in claim 7 wherein said "zero" key is located centrally of the other rows of number keys beneath the "eight" key in the bottom row and two further keys are located on opposite sides thereof.

9. A keyboard as claimed in claim 6 wherein said keyboard further comprises screen control command keys and special function keys, and wherein said screen control command keys, the special function keys and the letter and number keys are color coded.

10. A keyboard as claimed in claim 6 wherein said one key of said one row is the "zero" key and is located beneath the other rows of keys and the remaining keys are arranged in horizontal row containing the keys "1", "2" and "3", the keys "4", "5", and "6" and the keys "7", "8" and "9", arranged in ascending numberical order above said "zero" key.

11. a keyboard which enables ready use by a non-typist using only one hand, said keyboard comprising: a plurality of keys arranged in rows and columns, the width of the rows being substantially less than the length of the columns and being such as to permit spanning thereof with three fingers of one hand to permit typing with one hand only, said plurality of keys comprising a set of twenty-six letter keys individually designating the twenty-six letters of the alphabet of the English language, said set comprising eight rows of three letter keys arranged so as to form three vertical columns, and one row of two letter keys positioned beneath the bottom row of the eight rows in respective alignment with two of said columns, said letter keys being arranged in alphabetical order in groups of three letters at a time with the two letter keys of said one row being the "y" and "z" keys and a further key being located in said one row in alignment with the one of said three columns, said keyboard further comprising an elongate "shift" bar and an elongate "space" bar disposed vertically along opposite sides of the keyboard and extending along the entire vertical distance encompassed by said plurality of letter keys, and first and second elongate "enter" keys located at the top and bottom of the keybard above and below the letter keys and of a width greater than the width of the rows of keys.

12. A keyboard as claimed in claim 11 wherein the letter keys are arranged in the dextral left-to-right sequence abc, def, ghi, jkl, mno, pqr, stu, vwx, and yz.

13. A keyboard as claimed in claim 11 wherein the letter keys are arranged in the sinistral right-to-left sequence cba, fed, ihg, lkj, onm, rqp, uts, xwv, and zy.

14. A keyboard as claimed in claim 11 wherein said plurality of keys further comprises a set of ten number keys designating the numerals 0 to 9 and arranged in three rows of three keys and one row of one key.

15. A keyboard as claimed in claim 14 wherein said one key of said one row is the "zero" key and is located beneath the other rows of keys and the remaining keys are arranged in horizontal rows containing the keys "1", "2" and "3", the keys "4", "5" and "6" and the keys "7", "8" and "9", arranged in ascending numerical order above said "zero" key.

* * * * *